US 6,735,734 B1

United States Patent
Liebetreu et al.

(10) Patent No.: US 6,735,734 B1
(45) Date of Patent: May 11, 2004

(54) MULTIPOINT TDM DATA DISTRIBUTION SYSTEM

(76) Inventors: John M. Liebetreu, 9089 E. Davenport Dr., Scottsdale, AZ (US) 85250; Eric Martin Brombaugh, 1534 W. Jacinto Ave., Mesa, AZ (US) 85202; Bruce A. Cochran, 1454 N. Parsell Cir., Mesa, AZ (US) 85203; Ronald D. McCallister, 7701 E. Onyx Ct., Scottsdale, AZ (US) 85258

( * ) Notice: Subject to any disclaimer, the term of this patent is extended or adjusted under 35 U.S.C. 154(b) by 0 days.

(21) Appl. No.: 09/561,222

(22) Filed: Apr. 28, 2000

(51) Int. Cl.$^7$ ................................................ H04J 3/22
(52) U.S. Cl. ........................................ 714/775; 714/776
(58) Field of Search .................................. 714/774, 775, 714/776

(56) References Cited

U.S. PATENT DOCUMENTS

| | | | | |
|---|---|---|---|---|
| 5,023,889 A | | 6/1991 | Divsalar et al. ............... 375/27 |
| 5,128,757 A | * | 7/1992 | Citta et al. ............. 375/240.01 |
| 5,233,629 A | | 8/1993 | Paik et al. ..................... 375/39 |
| 5,233,630 A | | 8/1993 | Wolf ........................... 374/67 |
| 5,408,502 A | | 4/1995 | How ........................... 375/340 |
| 5,416,524 A | * | 5/1995 | Citta et al. .................. 348/471 |
| 5,511,099 A | * | 4/1996 | Ko et al. ..................... 375/368 |
| 5,606,578 A | | 2/1997 | O'Dea ......................... 375/298 |
| 5,671,253 A | * | 9/1997 | Stewart ....................... 375/316 |
| 5,914,962 A | * | 6/1999 | Fimoff et al. ............... 370/538 |
| 5,987,070 A | * | 11/1999 | Fimoff et al. ............... 375/286 |
| 6,141,389 A | * | 10/2000 | McCallister et al. ........ 375/295 |
| 6,167,539 A | * | 12/2000 | Takizawa ..................... 714/708 |
| 6,219,386 B1 | * | 4/2001 | Amrany et al. ............. 375/261 |
| 6,285,681 B1 | * | 9/2001 | Kolze et al. ................. 370/442 |
| 6,366,601 B1 | * | 4/2002 | Ghosh et al. ............... 375/130 |
| 6,392,500 B1 | * | 5/2002 | McCallister et al. ........ 332/103 |
| 6,407,843 B1 | * | 6/2002 | Rowan et al. ............... 398/202 |
| 6,442,129 B1 | * | 8/2002 | Yonge et al. ................ 370/204 |
| 6,445,750 B1 | * | 9/2002 | Chen et al. .................. 375/300 |
| 6,452,964 B1 | * | 9/2002 | Yoshida ....................... 375/222 |
| 6,493,402 B1 | * | 12/2002 | Fimoff ......................... 375/321 |
| 6,529,558 B1 | * | 3/2003 | Fimoff et al. ............... 375/262 |

OTHER PUBLICATIONS

Gardner, "A BPSK/QPSK Timing–Error Detector for Sampled Receivers", IEEE Transactions on Communications, vol. COM–34, No. 5, May 1986, pp. 423–429.*

* cited by examiner

Primary Examiner—Stephen M. Baker
(74) Attorney, Agent, or Firm—Lowell W. Gresham; Jordan M. Meschkow; Meschkow & Gresham, PLC

(57) ABSTRACT

A TDM data distribution system (10) includes a hub unit (12) with a multipoint transmitter (24) and any number of subscriber units (14), each of which has a multipoint receiver (28). A forward communication link (16) transmitted by the hub unit (12) exhibits a substantially constant baud and carrier frequency over a number of diverse modulation format (MF) time slots (42). However, the different MF slots (42) convey data using different modulation formats. Modulation order and coding rate may vary for different modulation formats. The multipoint transmitter (24) includes a number of encoding FEC processors (48), wherein each encoding FEC processor (48) is active only for selected ones of the different MF slots (42). When inactive, the internal states of the encoding FEC processors (48) are frozen. Each multipoint receiver (28) includes a decoding FEC processor (108) which is active only for MF slots (42) assigned to the same modulation format for which the decoding FEC processors (108) are programmed. When inactive, the internal states of the decoding FEC processors (108) are frozen.

36 Claims, 5 Drawing Sheets

| CONTROL CHANNEL 121 | | |
| --- | --- | --- |
| MF SLOT TIME OFFSET | ASSIGNMENT | MODULATION FORMAT (MF) |
| 0 | SU$_2$ | 16-QAM, RATE: --- |
| --- | SU$_3$, SU$_4$, ... | QPSK, RATE--- |
| --- | SU$_1$ | 64-QAM, RATE: --- |
| --- | SU$_3$, SU$_4$, ... | QPSK, RATE --- |
| --- | SU$_1$ | 64-QAM, RATE: --- |

MULTIPOINT TDM DATA DISTRIBUTION SYSTEM

TECHNICAL FIELD OF THE INVENTION

The present invention relates generally to the field of digital communications. More specifically, the present invention relates to multipoint TDM data distribution systems in which different modulation formats are applied to different portions of a TDM transmission signal.

BACKGROUND OF THE INVENTION

Time domain multiplexing (TDM) of a point-to-multipoint communication signal broadcast from a single transmission point to a plurality of reception points potentially provides numerous benefits. Using TDM, a single frequency channel operating in a given frequency band is subdivided to form two or more concurrent temporal channels which occupy the single frequency channel at discrete time intervals. One benefit of TDM is that each of the various reception points may be assigned its own private temporal channel. Another of the benefits of TDM is that the single frequency channel is continuously available at all reception points for maintaining receiver synchronization, even during temporal channels not assigned at a given reception point. Thus, when the assigned intervals occur for various temporal channels, little time is wasted in achieving synchronization. Another benefit is that the use of a continuous single frequency channel potentially permits the use of long coding blocks, which are advantageous for maximizing coding gain. Coding gain refers to the portion of gain shown by a communication link from forward error correction (FEC) achieved by encoding to-be-transmitted payload data. The payload data are encoded in accordance with a predetermined mathematical algorithm which combines error control bits with the payload data. The error control bits encoded with the payload data are used by a receiver to detect and correct errors.

On the other hand, the potential benefits of TDM have been difficult to achieve since undesirable sacrifices have conventionally been required. For example, it is desirable for a communication system to communicate using a wide variety of modulation formats and coding rates and for a media access controller (MAC) to have as much flexibility as possible in specifying such modulation formats and coding rates along with the durations of temporal channel intervals. Thus, when and where an excellent reception capability exists, such as on a clear day with no obstructions between a transmission point and a nearby reception point, a high modulation order and low coding rate may be specified to convey a greater amount of payload data in less time using a given power level and spectral occupancy. However, for other reception points that might be further away or partially obstructed from the transmission point, lower modulation orders and/or higher coding rates may be needed to successfully convey data at the given power level and spectral occupancy. The use of such lower modulation orders and/or higher coding rates causes less payload data to be conveyed in a given amount of time.

To efficiently use the assigned spectrum, a MAC is desirably empowered to offer each reception point the highest modulation order and lowest coding rate that will achieve a desired bit error rate (BER) using a given amount of power while confining the frequency channel to a given spectral occupancy. Conventional TDM communication systems have not been successful in achieving the potential benefits of TDM, while concurrently transmitting different temporal channels at different modulation orders and/or coding rates, and giving a MAC flexibility in assigning modulation order, coding rate, and temporal channel interval so as to utilize spectrum as efficiently as possible.

One reason conventional TDM systems have failed to provide flexibility in modulation order and coding rate concerns initiating and closing the intervals which define temporal channels. In order to maximize coding gain, higher performance digital communication systems conventionally employ more than one encoder in the transmitter and more than one decoder in the receiver. Such an architecture may be referred to as concatenated encoding. This desirable encoding architecture may use an inner convolutional encoding/decoding algorithm paired with an outer block or Reed Solomon encoding/decoding algorithm, or two separate convolutional encoding/decoding algorithms (i.e., turbo encoding).

Convolutional decoders tend to make errors in bunches. If a convolutional decoder fails to correct an error, it is likely to output several errors in a brief interval. The decoder paired with a convolutional decoder is much more successful at detecting and correcting errors if it does not see bursts of errors, but sees the errors spread out in time. Consequently, interleaving in the transmitter and deinterleaving in the receiver are conventionally performed between the two coding algorithms to temporally spread adjacent bits over a large period of time so that a bunch of errors appearing at the output of a convolutional decoder are less likely to be presented together at the paired decoder. While this technique improves coding gain performance, it also makes the initiation and closing of temporal channels which convey interleaved data indistinct until conveyed data may be detected and deinterleaved. The complication of interleaved modulation formats and/or coding rates which would occur at the beginning and ending of discrete temporal channels using conventional techniques has prevented the provision of variable modulation formats and coding rates in TDM communication systems.

One solution to the problem of interleaved modulation formats at the initiation and closing of temporal channels might be to flush interleavers using dummy data at the temporal channel boundaries. That way, each modulation format would be intermingled only with dummy data, and a receiver need not simultaneously detect data modulated using different modulation formats. However, this solution wastes payload-conveying capacity by conveying dummy data rather than payload data. Moreover, since the amount of wastage increases as temporal channel intervals shrink, a MAC would be undesirable constrained to prevent temporal channel intervals from becoming too short and thereby worsen wasted payload-conveying capacity.

SUMMARY OF THE INVENTION

It is an advantage of the present invention that an improved multipoint TDM data distribution system is provided.

Another advantage of the present invention is that a TDM data distribution system is provided which accommodates variable modulation formats and coding rates.

Another advantage of the present invention is that a TDM data distribution system is provided with improved flexibility in devising temporal channels because coding gain considerations are largely decoupled from temporal channel interval considerations.

Another advantage of the present invention is that the additional complexity required to implement the present invention is largely confined to a hub in a point-to-multipoint communication system.

Another advantage of the present invention is that it allows a data distribution system to improve the efficiency with which an assigned amount of spectrum is used to convey data.

These and other advantages are realized in one form by an improved multipoint transmitter for use in a digital time-division multiplex (TDM) communication system which transmits payload data to a plurality of reception points. The multipoint transmitter includes a first encoding forward error correction (FEC) processor configured to encode a first portion of the payload data by adding first error control bits to generate first FEC-encoded data modulated in accordance with a first modulation format. A second encoding FEC processor is configured to encode a second portion of the payload data by adding second error control bits to generate second FEC-encoded data modulated in accordance with a second modulation format. A pulse shaper has an input coupled to the first and second encoding FEC processors. The pulse shaper is configured to merge and filter the first and second FEC-encoded data into a substantially continuous transmission signal stream.

The above and other advantages are further realized in another form by an improved multipoint receiver for use in a digital time-division multiplex (TDM) communication system in which payload data are transmitted to a plurality of reception points. The multipoint receiver includes a downconversion section configured to receive a substantially continuous analog RF transmission signal and to generate a substantially continuous received data stream. A symbol tracking loop is coupled to the downconversion section. The symbol tracking loop is configured to synchronize to the received data stream to detect a substantially continuous baud clock. A decoding forward error correction (FEC) processor is configured to receive the received data stream and to generate FEC-decoded data in synchronism with the baud clock. A controller is coupled to the FEC processor. The controller is configured to selectively allow and prevent synchronous operation of the decoding FEC processor with the substantially continuous baud clock.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
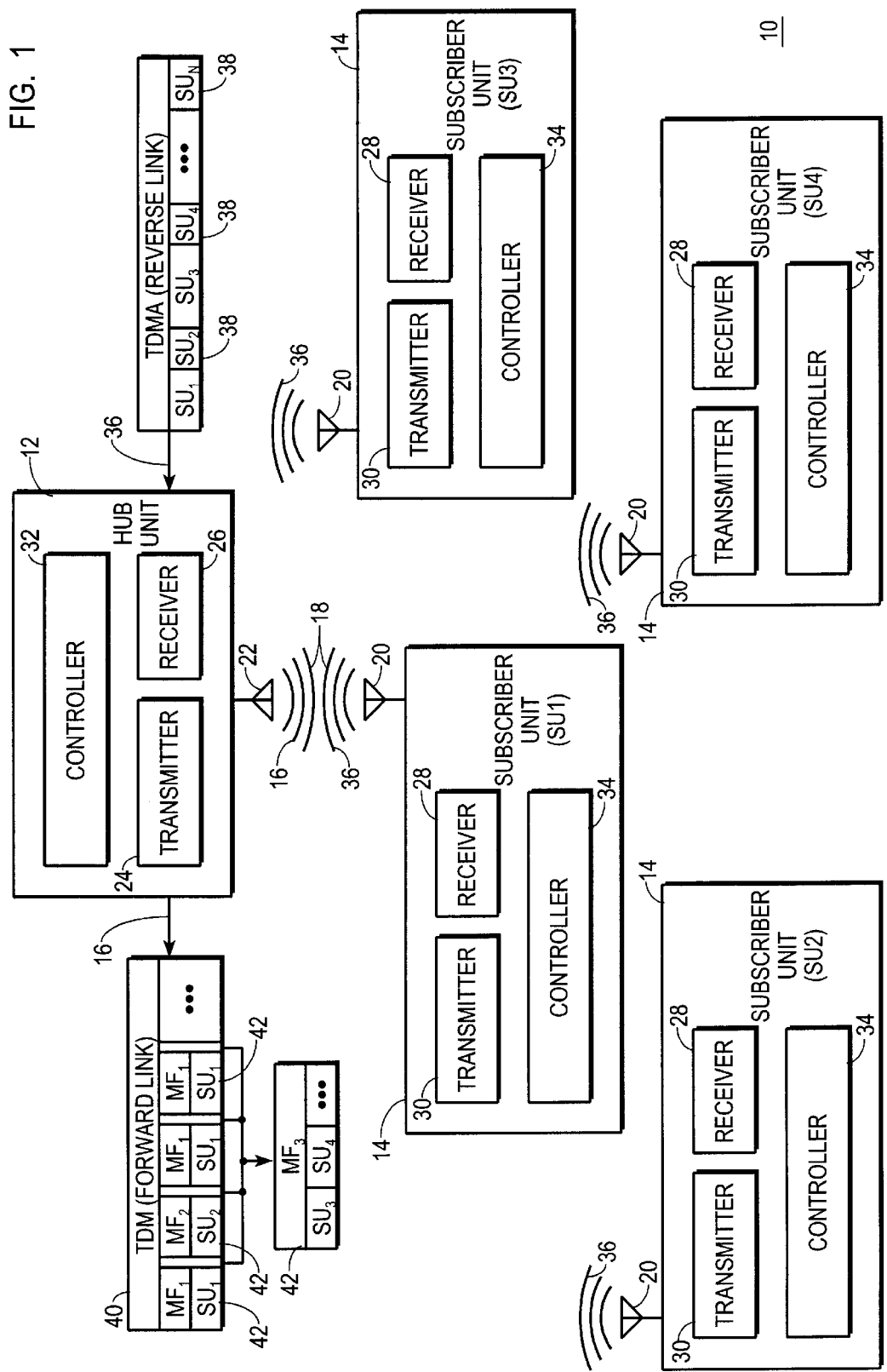
FIG. 1 shows a layout diagram of a digital multipoint TDM data distribution system configured in accordance with the teaching of the present invention.

FIG. 1 shows a layout diagram of a digital multipoint TDM data distribution system 10 configured in accordance with the teaching of the present invention. System 10 includes a hub unit 12 and any number of customer premise equipment, referred to as subscriber units 14 herein. Subscriber units 14 are located within radio range of hub unit 12, and each subscriber unit 14 is configured to communicate with hub unit 12. In the preferred embodiment of the present invention, that communication takes place via over-the-air, radio frequency (RF) broadcast transmissions. Furthermore, in the preferred embodiment, hub unit 12 and subscriber units 14 are substantially stationary so that the electromagnetic spectrum above several GHz may be used for the RF broadcast transmissions and so that no significant amount of Doppler or propagation delay variance need be compensated.

While all subscriber units 14 are located within radio range of hub unit 12, different subscriber units 14 may be positioned at reception points providing different abilities to receive a forward link 16 of a bidirectional channel 18 transmitted by hub unit 12. For example, antennas 20 of some subscriber units 14 may be located further away from an antenna 22 of hub unit 12. Some subscriber units 14 may have their line-of-sight paths between their antennas 20 and hub unit antenna 22 fully or partially obstructed by geographical features, buildings, foliage, or the like. Moreover, the reception quality may vary as a function of the weather. For example, atmospheric humidity and precipitation impact reception quality, and these factors may vary so as to affect different subscriber units 14 differently.

Hub unit 12 includes a multipoint transmitter 24 and a hub receiver 26. Subscriber units 14 each include a multipoint receiver 28 and a subscriber transmitter 30. Hub unit 12 includes a controller 32 for coordinating the activities of transmitter 24 and receiver 26 and the passage of payload data (not shown) into and from hub unit 12. A media access controller (not shown) may be implemented, at least in part, in controller 32. The payload data provided to hub unit 12 for transmission to one or more subscriber units 14 and obtained from hub 12 after reception from one or more subscriber units 14 may flow to a public communications network, such as an Internet protocol (IP), or asynchronous transfer mode (ATM) packet switched network, a circuit switched network, or the like. Likewise, subscriber units 14 each include a controller 34 for coordinating the activities of respective transmitters 30 and receivers 28 and the passage of payload data (not shown) into and from subscriber units 14. The payload data provided to subscriber unit 14 for transmission to hub unit 12 and obtained from subscriber unit 14 after reception from hub unit 12 may flow to a public communications network or be either consumed or generated by user equipment (not shown). Subscriber units 14 may be considered to be configured alike for the purposes of the present description, but this is not a requirement of the present invention.

For the purposes of the present invention, payload data represents the data presented to hub unit 12 by a user for conveyance to a subscriber unit 14 or to a subscriber unit 14 for conveyance to hub unit 12. From the perspective of hub unit 12 and subscriber units 14, payload data is not encoded. In other words, payload data is to be conveyed as accurately as possible. In actuality, payload data may be encoded/decoded encrypted/decrypted, or otherwise manipulated by higher layers. Since hub unit 12 and subscriber unit 14 have no significant interest in the content of the payload data, whether or not such payload data are encoded, encrypted, or otherwise manipulated to meet the ultimate purpose of users is of no importance to system 10.

A reverse link 36 of bidirectional channel 18 is configured in accordance with conventional time division multiple access (TDMA) techniques. Over reverse link 36, multiple subscriber units 14 transmit to the single hub unit 12. Conventional techniques, such as a slotted aloha protocol over an access channel (not shown), may be used for control purposes, and any number of TDMA traffic channels 38 may be assigned as needed to best convey payload data from subscriber units 14 to hub unit 12. Each traffic channel 38 is defined by a distinct interval that is assigned to a given subscriber unit 14 at a specified instant in each frame or in a portion of a succession of frames. During the assigned intervals, which make up a TDMA traffic channel 38, the subscriber unit 14 to which the channel 38 is assigned transmits a burst which begins upon initiation of the intervals and ceases at the closing of the intervals. Desirably, encoding added by system 10 to payload data conveyed over reverse link 36 to a channel 38 does not overlap channel boundaries. In other words, encoding is confined within the burst.

Forward link 16 implements a time division multiplex (TDM) protocol which is discussed in more detail below. Forward link 16 operates in a different frequency band than reverse link 36 so that interference is avoided and so that each of links 16 and 36 operates continuously and operates independently of the other.

In general, frames 40 are temporally subdivided into any number of distinct modulation format (MF) time slots 42, hereinafter referred to as MF slots 42. Each MF slot 42 is a distinct interval in time when hub unit 12 transmits over forward link 16 using a modulation format different from the modulation formats of the preceding and following MF slots 42. The modulation format defines such digital communication parameters as modulation order, coding rate, and the like. Desirably, the media access controller or MAC (not shown) may specify that each subscriber unit 14 receives and demodulates its payload data in accordance with a modulation format appropriate for that subscriber unit 14, given the particular reception characteristics experienced by that subscriber unit 14. An appropriate modulation format uses the spectrum occupied by forward link 16 as efficiently as possible while assuring an acceptable bit error rate (BER). Other parameters being equal, the spectrum is used more efficiently when the payload data are communicated at a higher data rate through the use of a higher modulation order and/or higher coding rate.

FIG. 1 depicts in connection with an MF slot 42 labeled $MF_1$, that the same modulation format may be repeated in any number of MF slots 42 within a frame 40. However, as indicated in connection with an MF slot 42 labeled $MF_2$, the same modulation format need not be repeated in more than one MF slot 42. In the example illustrated in FIG. 1, modulation format $MF_1$ is exclusively assigned to a subscriber unit 14 labeled $SU_1$, and modulation format $MF_2$ is exclusively assigned to a subscriber unit 14 labeled $SU_2$. However, a modulation format need not be exclusively assigned to a particular subscriber unit 14, as illustrated by a modulation format labeled $MF_3$ which is repeated in several MF slots 42 and assigned to subscriber units 14 labeled $SU_3$ and $SU_4$. Desirably, each subscriber unit 14 assigned to receive and decode a particular modulation format receives and decodes all payload data conveyed during frames 40 for all MF slots 42 to which the modulation format is assigned, even though not all of such payload data are intended for all of such subscriber units 14.

The subdivision of frame 40 into MF slots 42 bears no relation to coding blocks. Likewise, no requirement exists for coding blocks to begin or end at MF slot 42 boundaries. Coding blocks are groups of data processed together for forward error correction (FEC) purposes. A receiver generally decodes an entire coding block before being able to accurately generate a significant portion of the payload data encoded therein. Thus, as indicated by the MF slots 42 to which modulation format $MF_1$ is assigned, long coding block lengths that extend over any number of MF slots 42 are readily supported. Since coding block considerations are independent of MF slot 42 considerations, a long coding block having no particular short latency requirement may be sent to one subscriber unit 14 concurrently with short coding blocks (e.g., using modulation formation $MF_3$) that do have a short latency requirement being sent to other subscriber units 14. This capability is beneficial in intermingling real time data conveyances, e.g., voice communications or video conferencing, with file transfer or other computer data communications.

Figure 2:
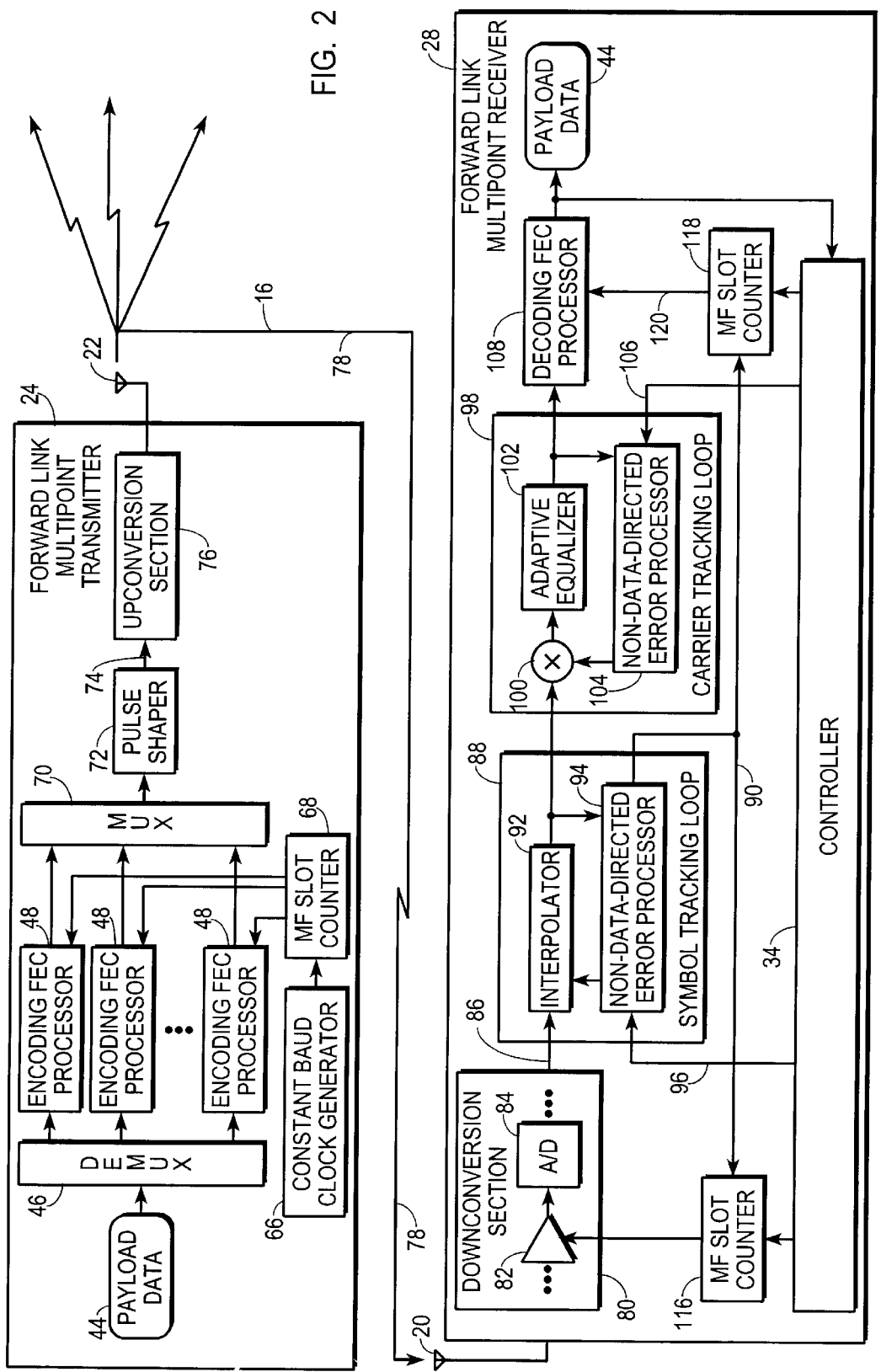
FIG. 2 shows a block diagram of a transmitter and receiver usable in a forward link of a digital multipoint TDM data distribution system configured in accordance with the teaching of the present invention.

FIG. 2 shows a block diagram of multipoint transmitter 24 and multipoint receiver 28 which communicate through forward link 16. Starting with transmitter 24, payload data 44 are parsed through a demultiplexer or router (demux) 46 to a number of encoding FEC processors 48. Different portions of payload data 44 are destined for different subscriber units 14 (FIG. 1), and these different portions may arrive at transmitter 24 in a random order. The MAC controls demux 46 in response to the subscriber unit 14 for which a packet or other portion of payload data 44 is destined. As discussed above, subscriber units 14 are assigned to modulation formats (FIG. 1) in a manner known to the MAC. Thus, by virtue of knowing a latency requirement for a portion of payload data 44, knowing the subscriber unit 14 destination for the portion of payload data 44, and knowing the subscriber unit 14 assignment to a modulation format, the MAC causes the portion of payload data 44 to be passed to an encoding FEC processor 48 which is dedicated to a given modulation format.

Figure 3:
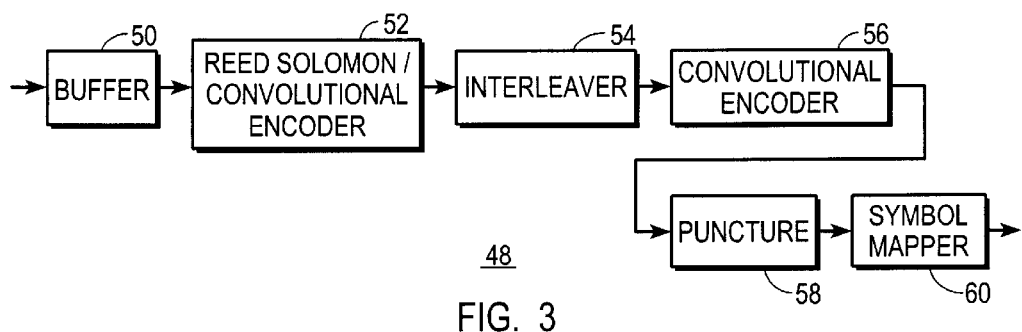
FIG. 3 shows a block diagram of an exemplary encoding FEC processor usable in the transmitter illustrated in FIG. 2.
Figure 4A:
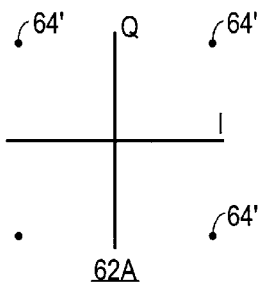
FIGS. 4A–4D graphically show exemplary phase point constellations that may be implemented by symbol mappers included in encoding FEC processors of the transmitter illustrated in FIG. 2.
Figure 4B:
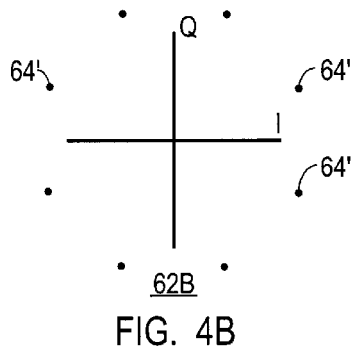
Figure 4C:
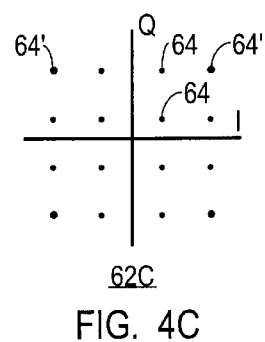
Figure 4D:
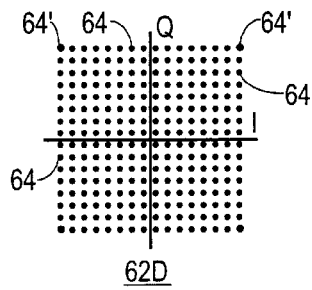

FIG. 3 shows a block diagram of an exemplary encoding FEC processor 48. In the preferred embodiment, all encoding FEC processors 48 have the same structure but are programmed to operate differently. Thus, the structure of only a single encoding FEC processor 48 is discussed below.

Encoding FEC processor 48 includes a buffer 50, preferably configured as a first-in-first-out (FIFO) memory, at which data are received from demux 46 (FIG. 2). Buffer 50 coordinates the timing of incoming payload data 44 (FIG. 2) with MF slots 42 in a manner well understood by those skilled in the art. An output of buffer 50 couples to an input of a first encoder 52.

First encoder 52 may be configured as a block encoder which implements a Reed Solomon or other block algorithm, as a convolutional encoder which implements a Viterbi or trellis algorithm, or any other type of encoder which is beneficial for FEC encoding purposes. FEC encoding applies a predetermined mathematical algorithm to payload data 44 (FIG. 2). The algorithm leads to the expansion in the quantity of data. The additional data are referred to as error control bits. A decoder in a receiver uses the error control bits combined with payload data 44 to detect and correct errors and shrink the quantity of data decoded by the amount of error control bits.

An output of first encoder 52 couples to an optional interleaver 54, and an output of interleaver 54 couples to an input of a second encoder 56. Second encoder 56 may implement a convolutional encoding algorithm. First and second encoders 52 and 56 may be viewed together as implementing a concatenated encoding algorithm. As depicted in FIG. 3, the concatenated encoding algorithm may use serially coupled encoders. However, those skilled in the art will appreciate that, particularly when implementing turbo encoding, other architectures may also be used. Such other architectures include parallel encoding, block product encoding, low density parity check encoding, and the like.

Those skilled in the art will appreciate that interleaver 54 is occasionally a desirable section to include in an encoding FEC processor because it spreads adjacent bits generated by first encoder 52 throughout a large block of data. In certain FEC encoding/decoding schemes, interleaving is desirable because, after deinterleaving in a receiver to de-spread the interleaved bits, a burst of errors which will occasionally be generated by one decoder in the receiver becomes spread out in time before being processed in another decoder. The use of interleaver 54 and a corresponding deinterleaver in the receiver causes the temporal boundary between coding blocks to become indistinct because adjacent payload data bits on opposing sides of a coding block boundary may be spread far apart with any number of intervening payload data bits. However, in the present invention no TDM performance penalty results from including interleaver 54 because coding block length is independent of MF slots 42 (FIG. 1) and coding blocks need not start or end at MF slot 42 boundaries. Consequently, even an interleaver 54 which causes very long coding blocks to result can be readily accommodated.

An output of second encoder 56 couples to an input of a puncture section 58. Puncture section 58 occasionally removes encoded bits from the FEC-encoded payload data stream, with system 10 operating under the assumption that coding gain is sufficient under current conditions for FEC decoding to correctly determine the values for the removed bits. By removing bits, fewer data need to be transmitted, and the spectrum is used more efficiently. Thus, puncture section 58 is used to define a specified coding rate. Desirably, puncture section 58 is programmable, and different encoding FEC processors 48 implement different coding rates. However, nothing requires puncturing to be performed in a given encoding FEC processor 48.

An output of puncture section 58 couples to an input of a symbol mapper 60. Symbol mappers are well known to those skilled in the art, where they are also referred to as signal mappers, phase point mappers, phase mappers, signal point mappers, mapping devices, and the like. Symbol mapper 60 translates a group of FEC-encoded payload data bits into a single phase point in a complex plane.

FIGS. 4A–4D graphically show exemplary phase point constellations 62a–62d, respectively. Any one of phase point constellations 62a–62d or other phase point constellations not depicted in the Figures may be implemented by symbol mapper 60. Phase point constellations 62a–62d differ from each other in one regard by specifying different modulation orders. Phase point constellation 62a depicts QPSK modulation, wherein two data bits are mapped into one of four possible phase points 64 during each mapping. Typically, phase point mappings occur at the baud rate, or in a unit of time known as a unit interval. Thus, one phase point is generated per unit interval, or phase points may be viewed as being generated at the baud rate. Phase point constellation 62b depicts 8-PSK modulation, wherein three data bits are mapped into one of eight phase points 64 during each mapping. Phase point constellation 62c depicts 16-QAM modulation, wherein four data bits are mapped into one of sixteen phase points 64 during each mapping, and phase point constellation 62d depicts 64-QAM modulation, wherein six data bits are mapped into one of sixty-four phase points 64 during each mapping.

A wide variety of phase point constellations 62 may be implemented by any given symbol mapper 60. However, in order for receivers to conveniently maintain non-data directed carrier synchronization, discussed further below, phase point constellations 62 having eight or fewer greatest magnitude phase points 64' are more preferred. Square phase point constellations, such as QPSK, 16-QAM and 64-QAM each have four greatest magnitude phase points 64' at the corners of the phase point constellations 62. The 8-PSK constellation 62B has eight greatest magnitude phase points 64'.

Greater payload data rates and better spectral efficiency are gained through the use of higher modulation orders, other parameters remaining constant. Thus, six bits are communicated during each unit interval using 64-QAM but only two bits using QPSK. Of course, reception conditions need to be better in order to achieve a given BER using 64-QAM than using QPSK because the members of the alphabets of phase points 64 are more easily distinguished from one another in a receiver using QPSK modulation.

In the preferred embodiment, symbol mappers 60 (FIG. 3) of different encoding FEC processors 48 (FIG. 2) can implement different phase point constellations 62 to achieve different modulation orders. Between the use of different coding rates and different modulation orders in different encoding FEC processors 48, the different encoding FEC processors 48 apply different modulation formats to the data they process, and the different modulation formats cause the payload data 44 (FIG. 2) processed thereby to exhibit different data rates.

Referring back to FIG. 2, transmitter 24 additionally includes a substantially constant baud clock generator 66. Throughout the various MF slots 42 (FIG. 1), the baud rate and unit interval duration do not substantially vary. As will be discussed in more detail below, the use of a substantially constant baud clock across diverse modulation formats aids the maintenance of baud synchronization in receivers 28. An output of clock generator 66 couples to an MF slot counter 68, which has different clock outputs coupled to different encoding FEC processors.

Figure 5:
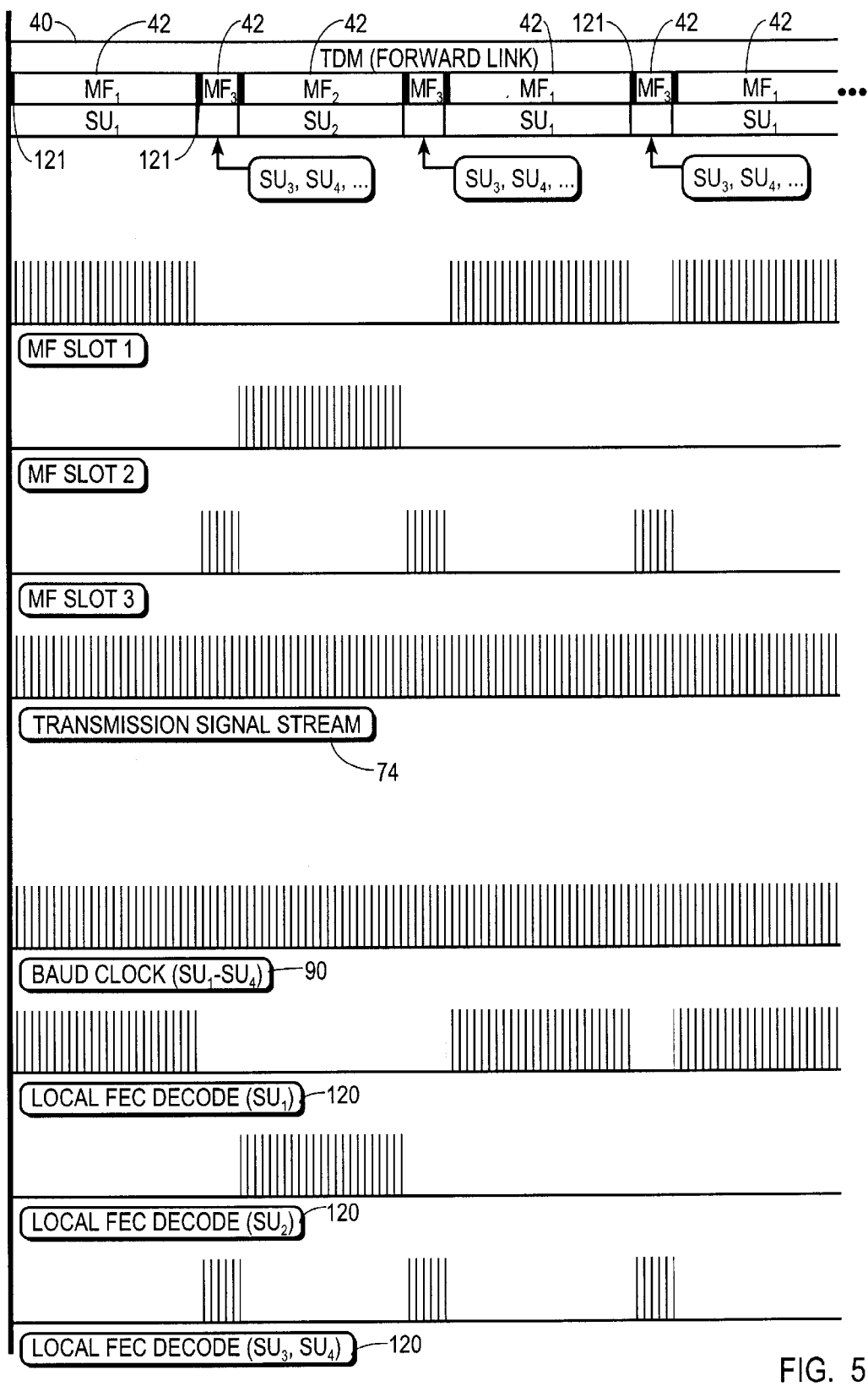
FIG. 5 shows a timing diagram of exemplary signals generated in the transmitter and receiver illustrated in FIG. 2.

FIG. 5 shows a timing diagram of exemplary signals generated in transmitter 24 and receiver 28. The timing diagram depicts the exemplary signals in association with TDM frame 40. The signal labeled "MF SLOT 1" schematically depicts the baud clock applied to one of encoding FEC processors 48, particularly to the one which has been assigned to provide modulation format MF$_1$ during the MF slots 42 to which modulation format MF$_1$ has been assigned. Likewise, the signals labeled "MF SLOT 2" and "MF SLOT 3" schematically depict the baud clocks routed to two of encoding FEC processors 48, particularly to the two which have been respectively assigned to provide modulation formats MF$_2$ and MF$_3$ during the MF slots 42 to which modulation formats MF$_2$ and MF$_3$ have been assigned.

During the MF slots 42 to which any single modulation format has been assigned, the subject encoding FEC processor 48 is enabled to encode payload data 44 (FIG. 2). During all other MF slots 42, when other modulation formats are specified, this baud clock is inactive and the subject encoding FEC processor 48 is disabled. During the MF slots 42 when the subject encoding FEC processor 48 is disabled, its internal state is preserved. In other words, the states of all trellises, interleavers, block encoders, and the like in encoders 52 and 56 and in interleaver 54 (FIG. 3) do not change. Accordingly, the subject encoding FEC processor 48 remains ready to process payload data in the next enabled MF slot 42 immediately after the point where it stopped processing payload data in the last enabled MF slot 42.

Referring back to FIG. 2, the outputs of encoding FEC processors 48 couple to inputs of a multiplexer 70, and an output of multiplexer 70 couples to an input of a pulse shaper 72. Multiplexer 70 is configured to continuously supply the output generated by the activated one of encoding FEC processors 48 to pulse shaper 72.

Pulse shaper 72 implements a predetermined inter-symbol interference (ISI) minimizing, pulse shaping function, such as the well-known raised cosine, root Nyquist, pure Nyquist, or the like. Pulse shaper 72 is desirably implemented as a conventional finite impulse response (FIR) filter having a predetermined configuration of coefficients. Pulse shaper 72 significantly reduces the bandwidth requirements of the signal that will communicate payload data. Moreover, pulse shaper 72 merges the diverse symbol-mapped, FEC-encoded data streams from the different encoding FEC processors 48 into a single, substantially continuous transmission signal stream 74. As discussed above, the unit interval desirably remains constant through the various MF slots 42, so transmission signal stream 74 likewise exhibits a substantially constant unit interval. Transmission signal stream 74 is schematically depicted in FIG. 5.

An output of pulse shaper 72 couples to an input of an upconversion section 76. Upconversion section 76 translates transmission signal stream 74 into an analog RF transmission signal 78 which exhibits a substantially constant carrier frequency. An output of upconversion section 76 couples to antenna 22. Upconversion section 76 may include digital-to-analog converters, one or more oscillators which exhibit a substantially constant frequency over several frames 40, mixers, power amplifiers, and the like, all of which are conventionally included in upconversion sections of digital RF communication transmitters. The use of a substantially constant carrier for analog RF transmission signal 78 is desirable because it aids the maintenance of carrier synchronization in receivers 28, as discussed below.

Accordingly, analog RF transmission signal 78 is transmitted to all receivers 28 of subscriber units 14. Analog RF transmission signal 78 exhibits a substantially constant carrier frequency and a substantially constant baud clock throughout the various MF slots 42 of frames 40. However, different MF slots 42 exhibit different modulation orders, different coding rates and the like so that different modulation formats are exhibited. As a result, signal 78 conveys payload data 44 at different data rates during different MF slots 42.

Receiver 28 includes a downconversion section 80 having an input coupled to antenna 20. Downconversion section 80 desirably includes components conventionally found in downconversion sections of digital communication receivers, including bandpass filters, RF amplifiers, mixers, local oscillators, and the like. In addition, the signal path desirably includes a gain control circuit 82 ahead of an analog-to-digital (A/D) circuit 84. Digital circuits, such as a Hilbert transformation, may be included following A/D 84. An output of downconversion section 80 provides a digital, substantially continuous received data stream 86 which conveys in-phase and quadrature phase estimates of the complex spaces defined by phase point constellations 62 (FIGS. 4A–4D).

The output of downconversion section 80 couples to a symbol tracking loop 88. Symbol tracking loop 88 detects a substantially constant baud clock 90 (FIG. 5) conveyed by analog RF transmission signal 78 and exhibiting a substantially constant frequency. Symbol tracking loop 88 synchronizes to substantially continuous received data stream 86 and makes adjustments as needed to maintain synchronization. In the preferred embodiment, symbol tracking loop 88 includes an interpolator 92 and a non-data-directed error processor 94. The form of the received data stream 86 output from symbol tracking loop 88 generates data updated in synchronism with continuous baud clock 90. This output couples to an input of non-data-directed error processor 94, and an output of non-data-directed error processor 94 couples back to a control input of interpolator 92.

In a manner known to those skilled in the art, interpolator 92 provides symbol synchronization for receiver 28. Symbol synchronization, also known as bit synchronization, bit timing, symbol timing, and the like, refers to detecting the unit interval timing at which data are conveyed by analog RF transmission signal 78. Interpolator 92 operates under the control of a feedback loop which makes continuous adjustments to at least one interpolator parameter to track symbol timing. These adjustments are made throughout all MF slots 42. In the preferred embodiment, this feedback loop is a non-data directed feedback loop. In other words, this feedback loop operates without having to demodulate, detect and/or decode the data being conveyed by analog RF transmission signal 78. The use of a constant baud clock helps non-data-directed error processor 94 maintain symbol synchronization, particularly during MF slots 42 which convey payload data that receiver 28 cannot decode due to a different modulation format from the one for which receiver 28 is then configured to decode. When an MF slot 42 (FIGS. 1 and 5) conveying data destined for receiver 28 begins, receiver 28 need not waste time and compromise spectral efficiency by waiting until symbol synchronization occurs before decoding payload data 44.

Non-data-directed error processor 94 evaluates magnitude and phase relationships expressed in the form of the received data stream 86 output from symbol tracking loop 88 to generate an error signal which closes the non-data-directed feedback loop. An example of a suitable non-data-directed error processor 94 may be found by reference to U.S. Pat. No. 5,671,257, entitled "Symbol Timing Recovery Based On Complex Sample Magnitude," by Bruce A. Cochran and Ronald D. McCallister, and U.S. Pat. No. 5,764,102, entitled "Multi-Stage Symbol Synchronization," by Bruce A. Cochran and Ronald D. McCallister, incorporated herein by reference.

As indicated by a signal path 96 supplied by controller 34 to non-data-directed error processor 94, nothing prevents symbol tracking loop 88 from additionally participating in a data-directed feedback loop which adjusts symbol synchronization after carrier tracking has been achieved and valid data are being extracted from analog RF transmission signal 78. The extraction of such valid data will be allowed during the MF slots 42 in which a modulation format is used which matches the modulation format under which receiver 28 is operating. During MF slots 42 in which a modulation format is used which does not match the modulation format under which receiver 28 is operating, the extraction of data is prevented.

The output from symbol tracking loop 88 couples to a carrier tracking loop 98. Carrier tracking loop 98 maintains carrier synchronization using a non-data-directed feedback loop. In particular, carrier tracking loop 98 includes a mixer 100 which receives the input data stream. Mixer 100 couples to an input of an adaptive equalizer 102, and an output of adaptive equalizer 102 provides the carrier-synchronized version of received data stream 86 and couples to an input of a non-data-directed error processor 104. An output of non-data-directed error processor 104 couples to an input of mixer 100. Non-data-directed error processor 104 may be configured, for example, to hold greatest magnitude phase points 64' (FIGS. 4A–4D) at a desired orientation. The use of a constant frequency throughout MF slots 42 helps non-data-directed error processor 104 maintain carrier synchronization.

Since a non-data-directed feedback loop is provided, receiver 28 need not decode valid data from the received data stream in order for carrier synchronization to occur. Thus, carrier tracking loop 98 continues to operate and maintain carrier synchronization during MF slots 42 which convey payload data 44 modulated using an incompatible modulation format. When an MF slot 42 conveying payload data 44 modulated using a compatible modulation format begins, receiver 28 need not waste time and compromise spectral efficiency by waiting for carrier synchronization to occur before extracting valid data.

As indicated by a signal path 106 supplied by controller 34 to non-data-directed error processor 104, nothing prevents carrier tracking loop 98 from additionally participating in a data-directed carrier feedback loop which makes carrier offset adjustments after valid data are extracted from analog RF transmission signal 78. The extraction of such valid data will be allowed during the MF slots 42 in which a modulation format is used which matches the modulation format under which receiver 28 is operating. During MF slots 42 in which a modulation format is used which does not match the modulation format under which receiver 28 is operating, the extraction of data is prevented.

The received data stream output from carrier tracking loop 98 is directed to an input of a decoding FEC processor 108. Decoding FEC processor 108 complements one of the encoding FEC processors 48 (FIG. 2) included in multipoint transmitter 24.

Figure 6:
FIG. 6 shows a block diagram of an exemplary decoding FEC processor usable in the receiver illustrated in FIG. 2.

FIG. 6 shows a block diagram of an exemplary decoding FEC processor 108 usable in receiver 28. Decoding FEC processor 106 includes a first FEC decoder 110 which complements encoder 56 in the complementary encoding FEC processor 48 (FIG. 3). In other words, first decoder 110 decodes the data encoded by second encoder 56. First decoder 110 may be a convolutional decoder and is desirably programmed to perform branch metrics and slicing in a manner consistent with the phase constellation used in the complementary encoding FEC processor 48. In addition, first decoder 110 is desirably programmable to permit the insertion of erasure values to complement encoded bits which may have been punctured out in puncturing section 58 (FIG. 3) of the complementary encoding FEC processor 48.

An output of first decoder 110 couples to an optional deinterleaver 112. Deinterleaver 112 is included to complement interleaver 54 (FIG. 3) of encoding FEC processor 48. An output of deinterleaver 112 couples to an input of a second decoder 114. Second decoder 114 complements first encoder 52 (FIG. 3) of encoding FEC processor 48. Thus, second decoder 114 may implement a block code algorithm, such as Reed Solomon, or another algorithm, such as those used in connection with turbo coding.

Referring back to FIG. 2, payload 44 are generated by decoding FEC processor 108. At least a portion of the payload data 44, and specifically that portion addressed to the receiving subscriber unit 14 (FIG. 1), is presented to a user. Payload data 44 are also presented to controller 34 so that controller 34 and subscriber unit 14 may be responsive to a control channel, discussed below.

Receiver 28 additionally includes an MF slot counter 116 and an MF slot counter 118. In general, MF slot counters 116 and 118 count in synchronism with baud clock 90. MF slot counter 118 has a gated baud clock output 120 that couples to decoding FEC processor 108 and operates similarly to MF slot counter 68 in transmitter 24. MF slot counter 118 passes substantially continuous baud clock 90 to decoding FEC processor 108 only during those MF slots 42 for which payload data are configured in accordance with the compatible modulation format with which decoding FEC processor 108 of receiver 28 is programmed to operate. In an alternate embodiment, MF slot counter 118 may simply provide an enable signal which is gated with substantially continuous baud clock 90 or otherwise causes decoding FEC processor 108 to cease its synchronous operation with baud clock 90. FIG. 5 illustrates signals labeled "LOCAL FEC DECODE ($SU_1$)," "LOCAL FEC DECODE ($SU_2$)" and "LOCAL FEC DECODE ($SU_3$, $SU_4$)," which represent gated baud clock output 120 in four different subscriber units 14.

For each receiver 28 in each subscriber unit, when gated baud clock output 120 is active, decoding FEC processor 108 is enabled to process received data signal 86 (FIG. 2) into FEC-decoded data. The data are then processed in synchronism with substantially continuous baud clock 90. Thus, substantially one updated complex phase estimate value is processed by decoding FEC processor 108 per unit interval, and phase estimates are processed substantially at the baud rate. When gated baud clock output 120 is inactive, decoding FEC processor 108 ceases its processing activities. Moreover, when gated baud clock output 120 is inactive, the internal state of decoding FEC processor 108, including any trellises, deinterleavers and block decoders therein, is frozen. Such internal states do not change while TDM forward link 16 (FIG. 1) conveys data using other modulation formats. When another MF slot 42 compatible with the modulation format programmed into decoding FEC decoder 108 begins, gated baud clock output 120 becomes immediately active because symbol synchronization has been maintained throughout the inactive period, and decoding FEC processor 108 continues processing where it ceased processing at the end of the previous compatible MF slot 42.

MF slot counter 116 counts in synchronism with substantially continuous baud clock 90 outputs values which change as new MF slots 42 are initiated. The values track the modulation orders assigned to the MF slots 42. These values control the gain of the signal path in downconversion section 80. Accordingly, even though data are not decoded for all MF slots 42 in receiver 28, the signal input to A/D converter 84 may be kept properly normalized for conversion, so that symbol tracking loop 88 and carrier tracking loop 98 may continue to keep receiver 28 synchronized to analog RF transmission signal 78 during incompatible MF slots 42.

FIG. 5 illustrates one embodiment of a control channel 121, which is a portion of analog RF transmission signal 78.

In this exemplary embodiment, control channel 121 is a small interval occurring at the beginning of each MF slot 42. This interval is desirably configured using the same modulation format as is assigned to the MF slot 42 of which it is a part. In each MF slot 42, channel 121 repeats the same information presented in the other MF slots 42. As discussed below, a very small amount of data are thus conveyed, so spectral efficiency is not significantly compromised.

Figures 7, 8:
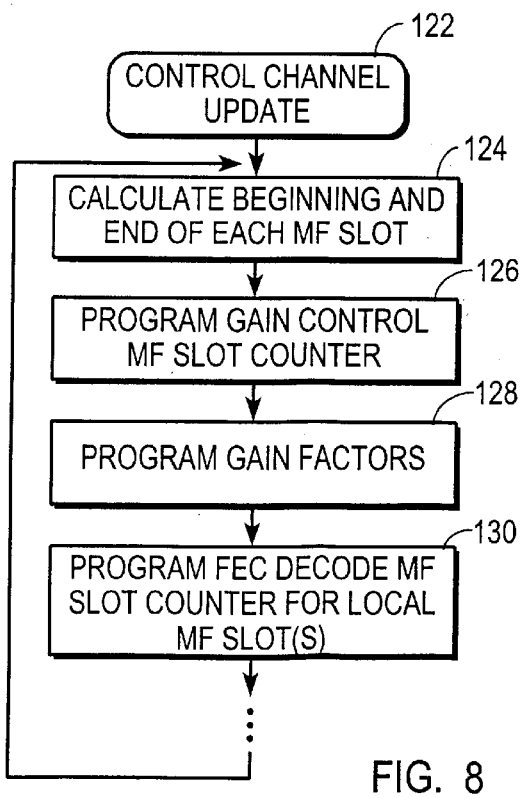
FIG. 7 shows a table indicating exemplary data associations conveyed in a control channel over the forward link.
FIG. 8 shows a control channel update process performed by a controller of the receiver illustrated in FIG. 2.

FIG. 7 shows a table indicating exemplary data associations conveyed over control channel 121. As shown in FIG. 7, controller 34 of receiver 28 may monitor control channel 121 to learn the timing of various MF slots 42 relative to a boundary of the current MF slot 42, the modulation formats assigned to MF slots 42, and the identities of subscriber units 14 assigned to MF slots 42. By learning such information, controller 34 can determine when to allow and when to prevent synchronous operation of decoding FEC processor 108 (FIG. 2) with substantially continuous baud clock 90 detected from analog RF transmission signal 78 (FIG. 2) and can program MF slot counters 116 and 118 accordingly.

FIG. 8 shows a control channel update process 122 performed by controller 34 of receiver 28. Process 122 is enacted through computer software stored in and executed by controller 34.

Process 122 includes a task 124 which calculates the beginning and end of each MF slot 42. The ends and beginnings, or boundaries, of MF slots 42 may be calculated by relating MF time slot offset data conveyed by control channel 121 to a local clock of receiver 28. The local clock desirably counts cycles of substantially continuous baud clock 90 (FIGS. 2 and 5) or another suitable signal, such as a frame count. Following task 124, a task 126 programs gain control MF slot counter 116 for timing control to change gain factors at the MF slot 42 boundaries. Next, a task 128 programs MF slot counter 116 for value control so that the appropriate gain factors are output during the various MF slots 42. The appropriate gain factors may be determined after learning the modulation formats indicated by control channel 121 as being used during the various MF slots 42. For example, a 64-QAM modulation format may require a greater gain factor than a QPSK modulation format.

After task 128, a task 130 programs FEC decoder MF slot counter 118 to identify the MF slots 42 associated with the modulation format to which decoding FEC processor 108 (FIG. 2) has been programmed. Again, an evaluation of control channel 121 provides the data upon which programming task 130 is based. The identity of the subscriber unit 14 for which task 130 is being performed is a prior known. When this identity is detected in control channel 121, the time slots associated with the identity in control channel 121 suggest how to program MF slot counter 118. Likewise if the modulation format data indicated in control channel 121 do not agree with the currently programmed modulation format, then task 130 may likewise program decoding FEC processor 108 to the indicated modulation format.

As indicated by ellipsis in FIG. 8, any number of additional tasks may be included in process 122. Eventually, process 122 repeats so that the programming in receiver 28 continuously tracks the data conveyed over control channel 121.

In summary, an improved multipoint TDM data distribution system is provided. The TDM data distribution system accommodates variable modulation formats and coding rates. In addition, the TDM data distribution system accommodates improved flexibility in devising temporal channels because coding gain considerations, which are influenced by coding block length, are largely decoupled from temporal channel interval considerations. Implementation of the present invention may increase complexity to some small degree. However, the small amount of additional complexity is largely confined to the hub in a point-to-multipoint communication system where costs associated with increased complexity may be most easily borne because they are associated with a large number of subscriber units. A communication system configured in accordance with the teachings of the present invention demonstrates improved spectral efficiency by being able to achieve the benefits of TDM communications while not requiring undesirable performance sacrifices in choosing FEC encoding/decoding algorithms.

Although the preferred embodiments of the present invention have been illustrated and described in detail, it will be readily apparent to those skilled in the art that various modifications may be made therein without departing from the spirit of the invention or from the scope of the appended claims.

What is claimed is:

1. A multipoint transmitter wherein said first and second encoding FEC processors and said pulse shaper are configured so that said substantially continuous transmission signal conveys said payload data using a substantially constant unit interval.

2. A multipoint transmitter for use in a digital multipoint time-division multiplex (TDM) data distribution system which transmits payload data to a plurality of reception points, said multipoint transmitter comprising:

a first encoding forward error correction (FEC) processor configured to encode a first portion of said payload data by adding first error control bits to generate first FEC-encoded data modulated in accordance with a first modulation format;

a second encoding FEC processor configured to encode a second portion of said payload data by adding second error control bits to generate second FEC-encoded data modulated in accordance with a second modulation format, wherein each of said first and second encoding FEC processors includes a symbol mapper; and a pulse shaper having an input coupled to said first and second encoding FEC processors, said pulse shaper being configured to merge and filter said first and second FEC-encoded data into a substantially continuous transmission signal stream.

3. A multipoint transmitter as claimed in claim 2 wherein said symbol mappers of said first and second encoding FEC processors implement different phase point constellations.

4. A multipoint transmitter as claimed in claim 3 wherein each of said different phase point constellations of said first and second encoding FEC processors has eight or fewer greatest magnitude phase points.

5. A multipoint transmitter as claimed in claim 2 wherein:

said first encoding FEC processor processes said first portion of said payload data at a first data rate; and said second encoding FEC processor processes said second portion of said payload data at a second data rate.

6. A multipoint transmitter for use in a digital multipoint time-division multiplex (TDM) data distribution system which transmits payload data to a plurality of reception points, said multipoint transmitter comprising:

a first encoding forward error correction (FEC) processor configured to encode a first portion of said payload data by adding first error control bits to generate first FEC-encoded data modulated in accordance with a first modulation format;

a second encoding FEC processor configured to encode a second portion of said payload data by adding second error control bits to generate second FEC-encoded data modulated in accordance with a second modulation format, wherein each of said first and second encoding FEC processors includes a first FEC encoder coupled to a second FEC encoder so that said first encoding FEC processor performs concatenated encoding of said first portion of said payload data and said second encoding FEC processor performs concatenated encoding of said second portion of said payload data; and a pulse shaper having an input coupled to said first and second encoding FEC processors, said pulse shaper being configured to merge and filter said first and second FEC-encoded data into a substantially continuous transmission signal stream.

7. A multipoint transmitter as claimed in claim 6 wherein each of said first and second encoding FEC processors additionally includes an interleaver coupled between said first and second FEC encoders.

8. A multipoint transmitter as claimed in claim 7 wherein at least one of said first and second FEC encoders is a convolutional encoder.

9. A multipoint transmitter for use in a digital multipoint time-division multiplex (TDM) data distribution system which transmits payload data to a plurality of reception points, said multipoint transmitter comprising:

a first encoding forward error correction (FEC) processor configured to encode a first portion of said payload data by adding first error control bits to generate first FEC-encoded data modulated in accordance with a first modulation format;

a second encoding FEC processor configured to encode a second portion of said payload data by adding second error control bits to generate second FEC-encoded data modulated in accordance with a second modulation format;

a pulse shaper having an input coupled to said first and second encoding FEC processors, said pulse shaper being configured to merge and filter said first and second FEC-encoded data into a substantially continuous transmission signal stream; and an upconversion section coupled to said pulse shaper, said upconversion section being configured to translate said substantially continuous transmission signal stream into an analog RF transmission signal which exhibits a substantially constant carrier frequency.

10. A multipoint transmitter as for use in a digital multipoint time-division multiplex (TDM) data distribution system which transmits payload data to a plurality of reception points, said multipoint transmitter comprising:

a first encoding forward error correction (FEC) processor configured to encode a first portion of said payload data by adding first error control bits to generate first FEC-encoded data modulated in accordance with a first modulation format;

a second encoding FEC processor configured to encode a second portion of said payload data by adding second error control bits to generate second FEC-encoded data modulated in accordance with a second modulation format;

a pulse shaper having an input coupled to said first and second encoding FEC processors, said pulse shaper being configured to merge and filter said first and second FEC-encoded data into a substantially continuous transmission signal stream; and a baud clock generator having a first output coupled to said first encoding FEC processor and a second output coupled to said second encoding FEC processor, said baud clock generator being configured to generate a first baud clock signal at said first output, said first baud clock signal being active while said pulse shaper filters said first FEC-encoded data, and said second baud clock signal at said second output, said second baud clock signal being active while said pulse shaper filters said second FEC-encoded data.

11. A multipoint transmitter as claimed in claim 10 wherein said baud clock generator is further configured so that said first baud clock signal is inactive when said second baud clock signal is active and said second baud clock signal is inactive when said first baud clock signal is active.

12. A method of operating a multipoint transmitter in a digital multipoint time-division multiplex (TDM) data distribution system which transmits payload data to a plurality of reception points, said method comprising:

enabling a first encoding forward error correction (FEC) processor to encode a first portion of said payload data for a first portion of a substantially continuous transmission signal stream and to generate first FEC-encoded data modulated in accordance with a first modulation format;

enabling a second encoding FEC processor to encode a second portion of said payload data for a second portion of said substantially continuous transmission signal stream and to generate second FEC-encoded data modulated in accordance with a second modulation format;

disabling said first encoding FEC processor during said second portion of said substantially continuous transmission signal stream to preserve an internal state of said first encoding FEC processor;

disabling said second encoding FEC processor during said first portion of said substantially continuous transmission signal stream to preserve an internal state of said second encoding FEC processor; and pulse-shaping said first and second FEC-encoded data to generate said substantially continuous transmission signal stream.

13. A method as claimed in claim 12 wherein:

said substantially continuous transmission signal stream exhibits a unit interval; and said pulse-shaping activity comprises maintaining said unit interval substantially constant throughout said first and second portions of said substantially continuous transmission signal stream.

14. A method as claimed in claim 12 additionally comprising upconverting said substantially continuous transmission signal stream into an analog RF transmission signal which exhibits a substantially constant carrier frequency throughout said first and second portions of said substantially continuous transmission signal stream.

15. A method as claimed in claim 12 wherein:

said first FEC-encoded data are mapped in said first encoding FEC processor in accordance with a first phase point constellation; and said second FEC-encoded data are mapped in said second encoding FEC processor in accordance with a second phase point constellation.

16. A multipoint receiver as claimed in claim 1 wherein said symbol tracking loop is a non-data directed symbol tracking loop.

17. A multipoint receiver as claimed in claim 1 additionally comprising a carrier tracking loop adapted to receive and apply carrier offset adjustments to said received data stream, said carrier tracking loop being configured to maintain carrier synchronization when said controller prevents synchronous operation of said FEC processor with said substantially continuous baud clock.

18. A multipoint receiver as claimed in claim 17 wherein said carrier tracking loop is a non-data directed carrier tracking loop.

19. A multipoint receiver for use in a digital multipoint time-division multiplex (TDM) data distribution system in which payload data are transmitted to a plurality of reception points, said multipoint receiver comprising:

a downconversion section configured to receive a substantially continuous analog RF transmission signal and to generate a substantially continuous received data stream;

a symbol tracking loop coupled to said downconversion section, said symbol tracking loop being configured to synchronize to said received data stream to detect a substantially continuous baud clock;

a decoding forward error correction (FEC) processor configured to receive said received data stream and to generate FEC-decoded data in synchronism with said baud clock; and a controller coupled to said FEC processor, wherein said controller is configured to selectively allow and prevent synchronous operation of said decoding FEC processor with said substantially continuous baud clock, and to evaluate a control channel portion of said RF transmission signal to determine when to allow and when to prevent synchronous operation of said decoding FEC processor with said substantially continuous baud clock.

20. A multipoint receiver as claimed in claim 1 wherein:

said substantially continuous analog RF transmission signal exhibits diverse modulation formats; and said downconversion section includes a gain control circuit having an output coupled to an analog-to-digital converter, said gain control circuit being configured to apply gain factors to said substantially continuous analog RF transmission signal which track said diverse modulation formats.

21. A multipoint receiver as claimed in claim 1 wherein:

said substantially continuous analog RF transmission signal exhibits a plurality of diverse modulation formats; and said controller is configured to allow synchronous operation of said decoding FEC processor with said substantially continuous baud clock to process only one of said plurality of diverse modulation formats.

22. A multipoint receiver as claimed in claim 1 wherein said decoding FEC processor comprises:

a first FEC decoder;

a deinterleaver coupled to said first FEC decoder; and a second FEC decoder coupled to said deinterleaver, wherein at least one of said first and second FEC decoders is a convolutional decoder.

23. A method of operating a multipoint receiver in a digital multipoint time-division multiplex (TDM) data distribution system in which payload data are transmitted to a plurality of reception points, said method comprising:

downconverting a substantially continuous analog RF transmission signal;

generating a substantially continuous received data stream in response to said downconverting activity;

detecting a substantially continuous baud clock from said substantially continuous received data stream via a non-data-directed error processor within a symbol tracking loop;

enabling a decoding forward error correction (FEC) processor to process a first portion of said substantially continuous received data stream into FEC-decoded data, wherein said first portion of said substantially continuous received data stream comprises payload data substantially synchronous with said substantially continuous baud clock; and disabling said decoding FEC processor during a second portion of said substantially continuous received data stream to maintain an internal state of said decoding FEC processor, wherein said second portion of said substantially continuous received data stream is asynchronous with said substantially continuous baud clock.

24. A method as claimed in claim 23 wherein said analog RF transmission signal is configured as a modulated carrier signal and said method additionally comprises:

synchronizing to said carrier signal during said enabling activity to achieve a carrier-synchronized state; and maintaining said carrier-synchronized state during said disabling activity.

25. A method as claimed in claim 23 wherein:

said substantially continuous analog RF transmission signal exhibits a plurality of diverse modulation formats; and said first portion of said received data stream coincides with only one of said plurality of diverse modulation formats.

26. A method as claimed in claim 23 wherein:

said decoding FEC processor includes first and second FEC decoders; and at least one of said first and second FEC decoders is a convolutional decoder.

27. A multipoint data distribution system in which time-division multiplex (TDM) communications are used to transmit payload data to a plurality of reception points, said system comprising:

a transmitter having a first encoding forward error correction (FEC) processor, a second encoding FEC processor, a pulse shaper configured to merge and filter data generated by said first and second encoding FEC processors into a substantially continuous transmission signal stream, and an upconversion section to convert said transmission signal stream into a substantially continuous analog RF transmission signal;

a first receiver having a first symbol tracking loop configured to detect a first substantially continuous baud clock from said analog RF transmission signal, a first decoding FEC processor which generates first FEC-decoded data in synchronism with said first baud clock, and a first controller which selectively prevents said first decoding FEC processor from synchronous operation with said first substantially continuous baud clock; and a second receiver having a second symbol tracking loop configured to detect a second substantially continuous baud clock from said analog RF transmission signal, a second decoding FEC processor which generates second FEC-decoded data in synchronism with said second baud clock, and a second controller which selectively prevents said second decoding FEC processor from synchronous operation with said second substantially continuous baud clock.

28. A multipoint data distribution system as claimed in claim 27 wherein:
   said first decoding FEC processor decodes data encoded by said first encoding FEC processor; and
   said second decoding FEC processor decodes data encoded by said second encoding FEC processor.

29. A multipoint data distribution system as claimed in claim 27 wherein:
   said system additionally comprises a third receiver having a third symbol tracking loop configured to detect a third substantially continuous baud clock from said analog RF transmission signal, a third decoding FEC processor which generates third FEC-decoded data in synchronism with said third baud clock, and a third controller which selectively prevents said third decoding FEC processor from synchronous operation with said third substantially continuous baud clock; and
   said third decoding FEC processor decodes data encoded by said first encoding FEC processor.

30. A multipoint data distribution system as claimed in claim 27 wherein:
   said first and second receivers are respectively associated with first and second subscriber transmitters in first and second subscriber units;
   said transmitter is associated with a hub receiver in a hub unit;
   said first and second subscriber transmitters and said hub receiver are configured to use time-division multiple access (TDMA) to communicate data bursts from said first and second subscriber units to said hub.

31. A multipoint data distribution system as claimed in claim 27 wherein said transmitter is configured so that said first and second substantially continuous baud clocks detected from said analog RF transmission signal exhibit a substantially constant frequency.

32. A multipoint data distribution system as claimed in claim 27 wherein said transmitter is configured so that said analog RF transmission signal exhibits a substantially constant carrier frequency.

33. A multipoint data distribution system as claimed in claim 27 wherein:
   said first receiver substantially maintains carrier and baud synchronization when said first controller prevents said first decoding FEC processor from synchronous operation with said first baud clock; and
   said second receiver substantially maintains carrier and baud synchronization when said second controller prevents said second decoding FEC processor from synchronous operation with said second baud clock.

34. A multipoint data distribution system as claimed in claim 27 wherein said transmitter, said first controller and said second controller are mutually configured so that said first encoding FEC processor and said first decoding FEC processor cease FEC processing when said second encoding FEC processor and said second decoding FEC processor are engaged in FEC processing.

35. A multipoint data distribution system as claimed in claim 27 wherein:
   said first encoding FEC processor and said first decoding FEC processor process payload data at a first data rate; and
   said second encoding FEC processor and said second decoding FEC processor process payload data at a second data rate.

36. A multipoint data distribution system as claimed in claim 27 wherein:
   said first encoding FEC processor and said first decoding FEC processor process payload data in accordance with a first phase point constellation; and
   said second encoding FEC processor and said second decoding FEC processor process payload data in accordance with a second phase point constellation.

* * * * *

UNITED STATES PATENT AND TRADEMARK OFFICE
CERTIFICATE OF CORRECTION

PATENT NO. : 6,735,734 B1  Page 1 of 1
DATED : May 11, 2004
INVENTOR(S) : John M. Liebetreu It is certified that error appears in the above-identified patent and that said Letters Patent is hereby corrected as shown below:

Column 14,
Line 22, insert -- as claimed in claim 2 -- after the word transmitter and before the word wherein.

Column 16,
Lines 63 and 66, replace "1" with -- 19 --;

Column 17,
Lines 34, 43 and 51, replace "1" with -- 19 --.

Signed and Sealed this

Twenty-fourth Day of August, 2004

JON W. DUDAS
*Director of the United States Patent and Trademark Office*